United States Patent

Fujii et al.

[11] Patent Number: 5,898,883
[45] Date of Patent: Apr. 27, 1999

[54] MEMORY ACCESS MECHANISM FOR A PARALLEL PROCESSING COMPUTER SYSTEM WITH DISTRIBUTED SHARED MEMORY

[75] Inventors: Hiroaki Fujii, Hadano; Toshiaki Tarui; Naonobu Sukegawa, both of Kokubunji, all of Japan

[73] Assignee: Hitachi, Ltd., Tokyo, Japan

[21] Appl. No.: 08/368,618

[22] Filed: Jan. 4, 1995

[30] Foreign Application Priority Data

Jan. 25, 1994 [JP] Japan .................................. 6-023738

[51] Int. Cl.⁶ ................................................. G06F 15/16
[52] U.S. Cl. ............................ 395/800.28; 395/800.14; 395/200.31; 395/200.44; 395/200.46; 711/147; 711/148; 711/153
[58] Field of Search ..................... 395/444, 454, 395/474, 475, 412, 419, 800.1, 800.14, 200.31, 200.43–200.46, 800.28; 711/117, 127, 147, 148, 153, 202, 206, 5

[56] References Cited

U.S. PATENT DOCUMENTS

| | | | |
|---|---|---|---|
| 4,754,394 | 6/1988 | Brantley et al. | 711/5 |
| 5,093,913 | 3/1992 | Bishop et al. | 711/152 |
| 5,117,350 | 5/1992 | Parrish et al. | 711/1 |
| 5,247,629 | 9/1993 | Casamatta et al. | 711/206 |
| 5,265,235 | 11/1993 | Sindhu et al. | 711/120 |
| 5,341,483 | 8/1994 | Frank et al. | 711/206 |

FOREIGN PATENT DOCUMENTS 56-155465  12/1981  Japan .

OTHER PUBLICATIONS

Brorsson et al., "Local vs. Global Memory in the IBM RP3: Experiments and Performance Modelling," IEEE, 496–503, 1991.
W.C. Brantley et al, "RP3 Processor–Memory Element", International Conf. on Parallel Processing, 1985, pp. 782–789.

*Primary Examiner*—Larry D. Donaghue
*Assistant Examiner*—John Follansbee
*Attorney, Agent, or Firm*—Fay, Sharpe, Beall, Fagan, Minnich & McKee

[57] ABSTRACT

To increase the capacity of usable memory of a parallel processing computer system as a whole and effectively utilize the address space without waste, a variable-length Global/Local allocation field is provided in a fixed-length address. When the field is locally set, the address is used as an address of a local memory area to which the local processor refers. When the allocation is globally set, the remaining address is a variable length logical processor number (this number is converted into a physical processor number) and a variable length offset address, for specifying a global memory area belonging to a processor out of the global areas of memories of a group of some of the processors, which global memory can be referred to by all the processors of the groups. A memory access interface executes memory access to the local or global area of the memory of the local processor or to the global area of the memory of another processor.

28 Claims, 8 Drawing Sheets

| LOGICAL NO. | PHYSICAL NO. |
|---|---|
| 0 | 0 |
| 1 | 1 |
| 2 | 4 |
| 3 | 5 |

MEMORY ACCESS MECHANISM FOR A PARALLEL PROCESSING COMPUTER SYSTEM WITH DISTRIBUTED SHARED MEMORY

BACKGROUND OF THE INVENTION

The present invention relates to memory accessing and addressing for a parallel processing computer system. More particularly, the invention relates to a distributed/shared memory in which each of the processors constituting a parallel processing computer system can refer to all of the memories.

The demand for a high-speed processing performance of computers has prompted the appearance of a parallel processing computer system in which plural arithmetic processors are linked to each other. A TCMP (Tightly Coupled Multi-Processor) type parallel processing computer system has several arithmetic processors, which share one memory.

On the other hand, there has appeared a parallel processing computer system having many more arithmetic processors than those of the TCMP type, more specifically, several hundreds to several thousands of arithmetic processors. From the viewpoint of the degree of ease in realizing the hardware, each arithmetic processor has its own memory independently and the arithmetic processors do not share one storage, which is a parallel processing computer system of distributed memory type.

The distributed memory type can have a higher performance than the TCMP type. However, it has been pointed out that the distributed memory type parallel processor computer system involves some problems in portability being restricted by a conventional programming style (in which a single arithmetic processor and a single memory is assumed to be used) and in the case of programming generally. Therefore, in recent years, a distributed/shared memory type parallel processing computer system tends to be introduced increasingly in which each of the arithmetic processors of a distributed memory type can refer to the memories of the other arithmetic processors.

In order to implement a distributed/shared memory type, various problems should be solved. One of them is how to allow each of the processors to refer to the memories of the other processors. This problem can be solved by addressing. More specifically, in the address space of each processor, the memories of the other processors are mapped. For example, "RP3 Processor-Memory Element", p. 782 to p. 789, a proceeding on the International Conference on Parallel Processing in 1985 and U.S. Pat. No. 4,754,394 use an address having a format as shown in FIG. 4 to refer to the memory of the other arithmetic processors. Japanese Patent Laid-Open No. 155465/1981 uses an address having a type shown in FIG. 11.

The address shown in FIG. 4 is such that the accessed arithmetic processor having a memory to be referred to is designated by the fixed length processor number field 401, and the address in the memory is designated by the fixed length offset field 402. Also, the address shown in FIG. 11 is such that whether the memory to be referred to belongs to the accessing processor or to another processor is designated by one bit field F 1101; the accessed arithmetic processor having the memory to be referred to when accessing another processor is designated by the fixed length processor number field 1102; the address in the memory is designated by the fixed length offset field 1103; and the content of the fields 1102 and 1103 coupled to each other is used as the address when accessing the memory of the accessing processor.

SUMMARY OF THE INVENTION

It is an object of the present invention to analyze the prior art, understand problems associated with the prior art, analyze such problems, and provide solutions to such problems.

In the case of a parallel processing computer system having a maximum number of one thousand arithmetic processors, it is necessary to provide the processor number field 401 with 10 bits if the 32-bit address takes the format shown in FIG. 4 to realize a distributed/shared memory system. As a result, there are left only 22 bits for the offset field 402. Therefore, the maximum memory capacity that one arithmetic processor can have is at most four megabytes. This capacity is comparatively small. In this case, the maximum memory capacity of the parallel processing computer system is only four gigabytes as a whole. On the other hand, a parallel processing computer system of distributed memory type which does not adopt a distributed/shared memory system and which has the same number of arithmetic processors can have a maximum memory capacity of as many as four terabytes while having the same number of arithmetic processors and 32 bit addressing.

Further, in the case of an entry model having an address shown in FIG. 4 and which includes only ten to several tens of processors, only four to six bits are required for th e processor number field 401. Nevertheless, a width of 10 bits is given to the field 401, thus inevitably wasting much of the address space, which is a problem in the architecture of the address shown in FIG. 11.

In consideration of the problems mentioned above, for implementing a parallel processing computer system of distributed/shared memory type using a limited address space of 32 bits, with the prefer red embodiment, objects are:

(1) To allocate the memory capacity as a whole larger dynamically as required; and (2) To use the address space without waste.

In order to achieve the above-mentioned objects:

a variable-length Global/Local allocation field is provided in a fixed-length address, and when the field is locally set, the address is the local area to the memory of the local processor;

when the Global/Local allocation field is set globally, the address is a variable-length processor number field specifying one out of a Global group of some of the processors out of many possible processors constituting the parallel processing computer system, and an address on the memory of the processor specified; and each of the processors comprises a memory access interface for identifying the content of the Global/Local allocation field, for extracting the content of the processor number field, for extracting the content of the offset field, for starting access to a local area of local memory of the local processor as accessed by the address of the Local area when the result of the identification indicates that the content is set locally, for starting access to a global area of local memory of the local processor by the address of the offset field thus extracted when the result of the identification indicates that the content is set globally and the extracted content of the processor number field indicates the local processor, and for starting access to the global memory of other processors by the extracted address of the offset field when the result of the identification indicates that the content is set globally and the extracted address of the processor number field indicates another processor.

For identifying the content of the Global/Local allocation field, a mask register draws out the address part corresponding to the field by use of a mask. For extracting the content of the processor number field, a register indicates the bit width of the offset field. For extracting the content of the offset field, a mask register draws out the address part corresponding to the offset field by use of a mask. The content of each mask register and the content of the register for indicating the bit width of the offset field is rewritten in accordance with an instruction by a processor.

The logical processor number, which is the content of the processor number field, is converted into a physical processor number by a processor number conversion table. For starting each access, the physical processor number obtained by this conversion is used.

For starting access to the local memory of the local processor: a base address register holds address addition information for converting the head address of the Local area to the head address of the Local memory area allocation part in the memory, when the Local area is set in the memory; the conversion of the offset local address to the address in the real memory is implemented by use of the base address register; and the content of the base address register is rewritten in accordance with an instruction by a processor. Thus, the usable memory capacity of a parallel processing computer system as a whole is made greater as required, and the address space is utilized without waste. By using a variable-length processor number field, the number of processors in a global group implementing a distributed/shared memory is made variable. The size of the Global memory area allocated to each processor is also be made variable. Further, by setting a logical processor number in the processor number field, it is possible to specify a processor by a short field length, thereby providing a greater available Global memory area per processor. Also, the content of the register in the memory access interface is changeable by each processor by an instruction, to change the content of each field of the address by software.

BRIEF DESCRIPTION OF THE DRAWINGS

Further objects, features and advantages of the present invention will become more clear from the following detailed description of a preferred embodiment, described with respect to the accompanying drawing.

DETAILED DESCRIPTION OF A PREFERRED EMBODIMENT

Figure 3:
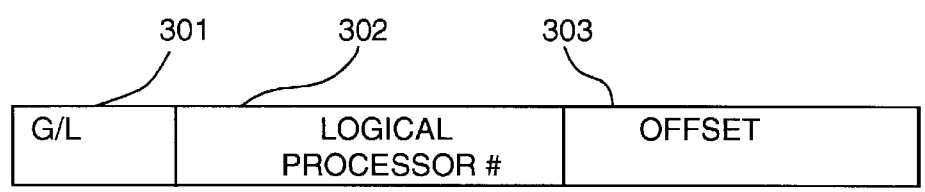
FIG. 3 shows an address format.

According to the present invention, each of the arithmetic processors refers to a local memory area of the processor itself, to which only this arithmetic processor (local processor) can refer. The memory areas of each arithmetic processor that can be referred to by the other processors are referred to as Global memory areas. In order to arbitrarily set the allocation of the address space of the Global area and Local area, a variable length Global/local allocation field 301 is provided in a total address having a fixed length as shown in FIG. 3. The bit width of this Global/Local allocation field 301 is set by software. When a Global/Local allocation field 301 is set L locally by a processor, all of the remaining address bits in fields 302, 303 become a Local address for addressing the dedicated Local memory area of the local processor that set the field. When a Global/Local allocation field 301 is set G globally, the remaining address becomes a logical processor number field 302 and an offset field 303. The processor number field 302 may hold a physical processor number, although a logical processor number is preferred. In order to eliminate any unused address space caused by allowing the Global area to be shared by an arbitrary number (that is some) of the arithmetic processors (group), the length of the logical processor number field 302 provided in the fixed-length address is variable (in contrast to the fixed length processor number field 401 shown in FIG. 4). The bit width of the logical processor number field 302 is set by software to be the minimum bit width required in view of the number of processors currently in the system or in a group of only some of the processors.

Conversion from the logical processor number, which is the content of the logical processor number field 302, to the physical processor number is automatically executed by hardware. However, a conversion table to be referred to when the number is converted can be prepared by software.

The larger the Local area, the larger is the total memory capacity of the parallel processing computer system. This is because the capacity of the Global areas reflects the total memory capacity of the parallel processing computer system; however, for the capacity of the Local area, the product of the local memory capacity by the number of arithmetic processors is the total memory capacity of the parallel computer system. The variable-length fields solve the aforesaid problem of small maximum total memory capacity in the prior art. For example, if one bit is used for the Global/Local allocation field in the 32-bit address, it is possible to provide Global areas, each having a memory capacity of two gigabytes, th at is, to provide a computer system memory having a total memory capacity equal to the product of two gigabytes by the number of arithmetic processors in the computer system.

Figure 4:
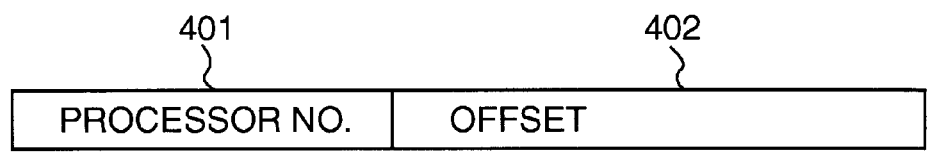
FIG. 4 shows an address format, which is useful in analyzing a parallel processing computer system which uses a conventional distributed/shared storage.

If the computer system is assumed to be equipped with one thousand arithmetic processors, a maximum total memory capacity of a little more than two terabytes is provided when the address shown in FIG. 3 is adopted, while a maximum total memory capacity of only four gigabytes is provided when the address shown in FIG. 4 of the prior art is adopted.

Figure 11:
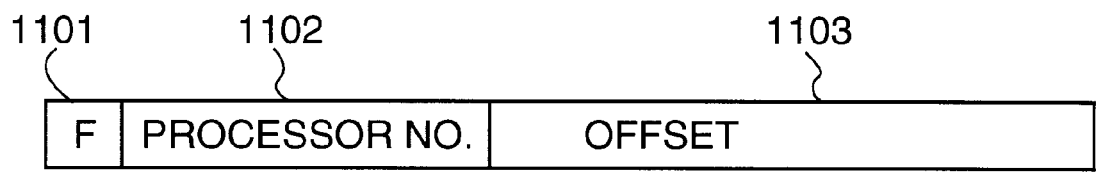
FIG. 11 shows an address format used in analyzing a conventional distributed/shared memory parallel computer.

The bit length of the logical processor number field 302 is variable, to solve the aforesaid problem of the prior art wherein there is wasted space in the addressing of FIG. 4 or FIG. 11. For example, in the prior art computer system using addressing of FIG. 4, having at most one thousand arithmetic processors, since the processor number field 401 has a fixed length of 10 bits in order to identify one thousand computers, the computer system can have a maximum total memory capacity of only four megabytes per arithmetic processor even when the computer system is limited to only sixteen arithmetic processors, if the address has a 32-bit width. Therefore only 64 megabyte maximum total memory capacity can be utilized by the whole prior art computer system.

On the other hand, when the width of the Global/Local allocation filed 301 is assumed to be zero bits according to the 32-bit address format shown in FIG. 3, the entire address bit length of 28 bits is utilized as the Global area, by limiting the length of the logical processor number field 302 to 4 bits to identify one of the above example of sixteen computers, and thereby each arithmetic processor can then have a maximum global memory area of 256 megabytes. In other words, for the parallel processing computer system as a whole, a maximum memory of four gigabytes is utilized (in contrast to the prior art 64 megabytes).

The preferred content of the logical processor number field 302 shown in FIG. 3 is the logical processor number, not the physical processor number. This leads to advantages which will be described.

Figures 9, 10:
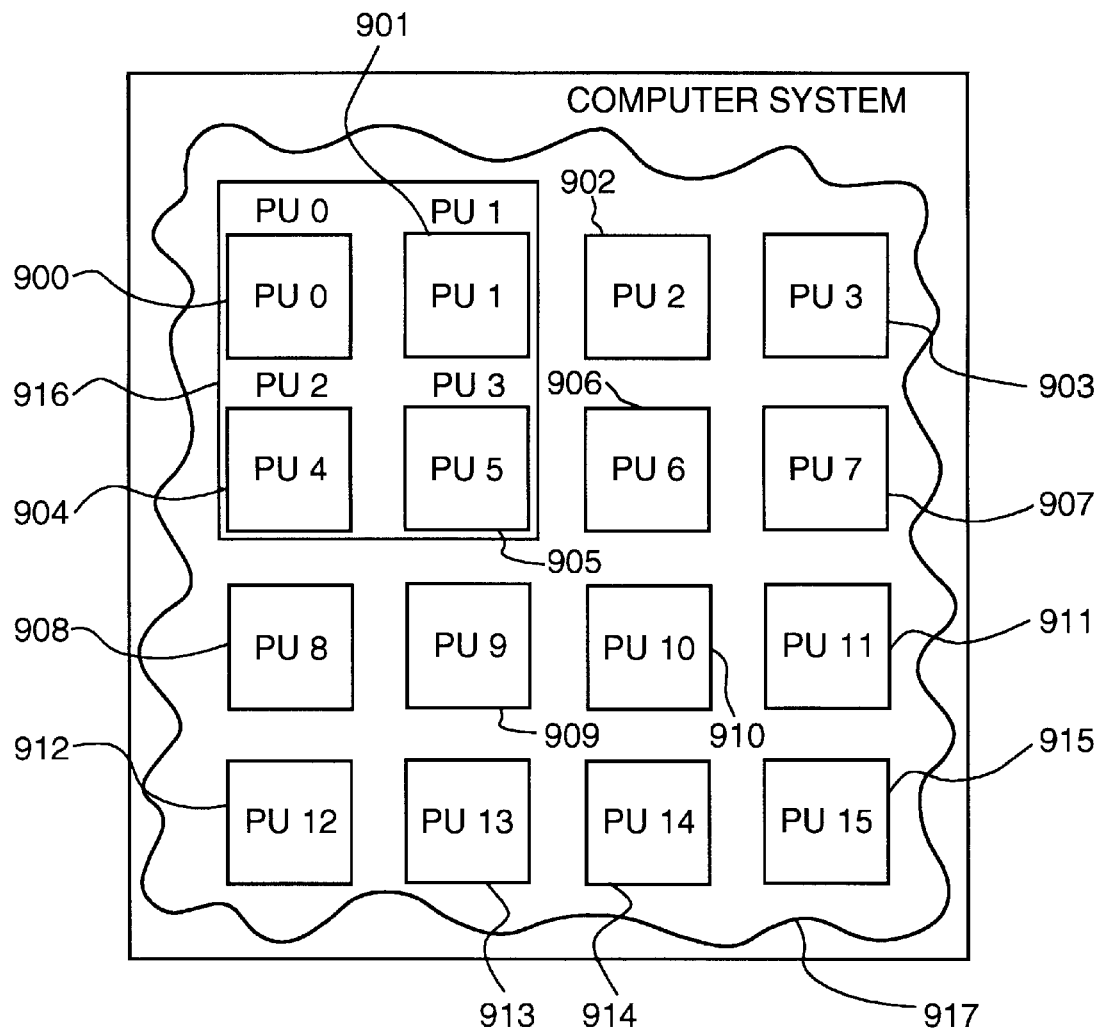
FIG. 9 illustrates a memory sharing group of processors.
FIG. 10 shows an example of setting a processor number conversion table of the memory access interface.

The parallel processing computer system, as shown in FIG. 9, operates in a division operation mode, e.g. in which only arithmetic processors having physical processor numbers 0, 1, 4, 5 are software selected as a group 916 for use from among 16 processors in the computer system. The four processors selected for use have logical processor numbers 0, 1, 2, 3. When the global memories are referred to by these four processors 900, 901, 904, and 905, the logical processor numbers 0, 1, 2, and 3 are allocated to the processors 900, 901, 904 and 905, respectively. As a result, the variable bit width of the logical processor number field 302, shown in FIG. 3, is software limited to two bits. If the content of the field 302 is a physical processor number, the field width must be at least four bits inevitably because it might be necessary to specify a number larger than seven, e.g. 15, as the physical processor number. Thus the preferred address offset field is two bits larger which is an advantage in using a logical processor number in the address.

Figure 2:
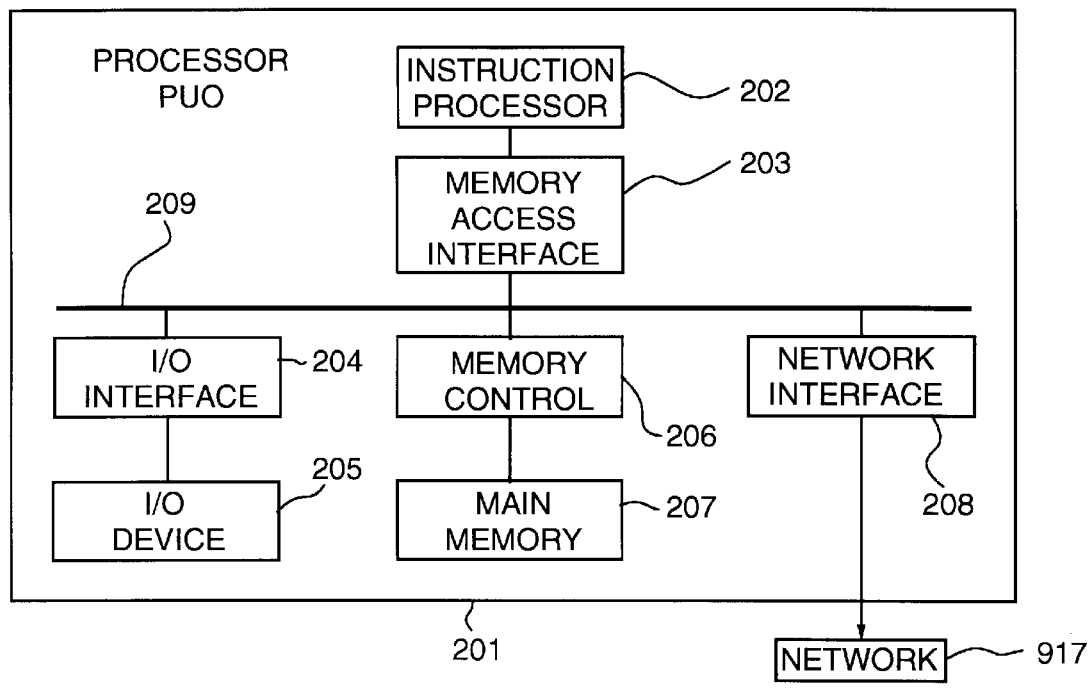
FIG. 2 shows a representative one of the processors constituting a parallel processing computer system.

A processor 201, e.g. PU0 as typical of each of the processors of the computer system of FIG. 9 is shown in FIG. 2 to comprise: an instruction processor 202 for executing a program; a memory access interface 203 connected to the instruction processor 202 to issue access requests to a main memory 207, an I/O device 205, main memories 207 in other processors 201, and others in accordance with the set of command/address/data output from the instruction processor 202; an I/O interface 204; a memory control 206; a network interface 208 for exchanging data with other processors 201 through a network 917 coupling the processors to each other; an I/O device 205 connected to the I/O interface 204; the main memory 207 connected to the memory control 206; and a bus 209 which connects the memory access interface 203, I/O interface 204, memory control unit 206, and network interface 208 for exchange of address, control and data signals.

Figure 1:
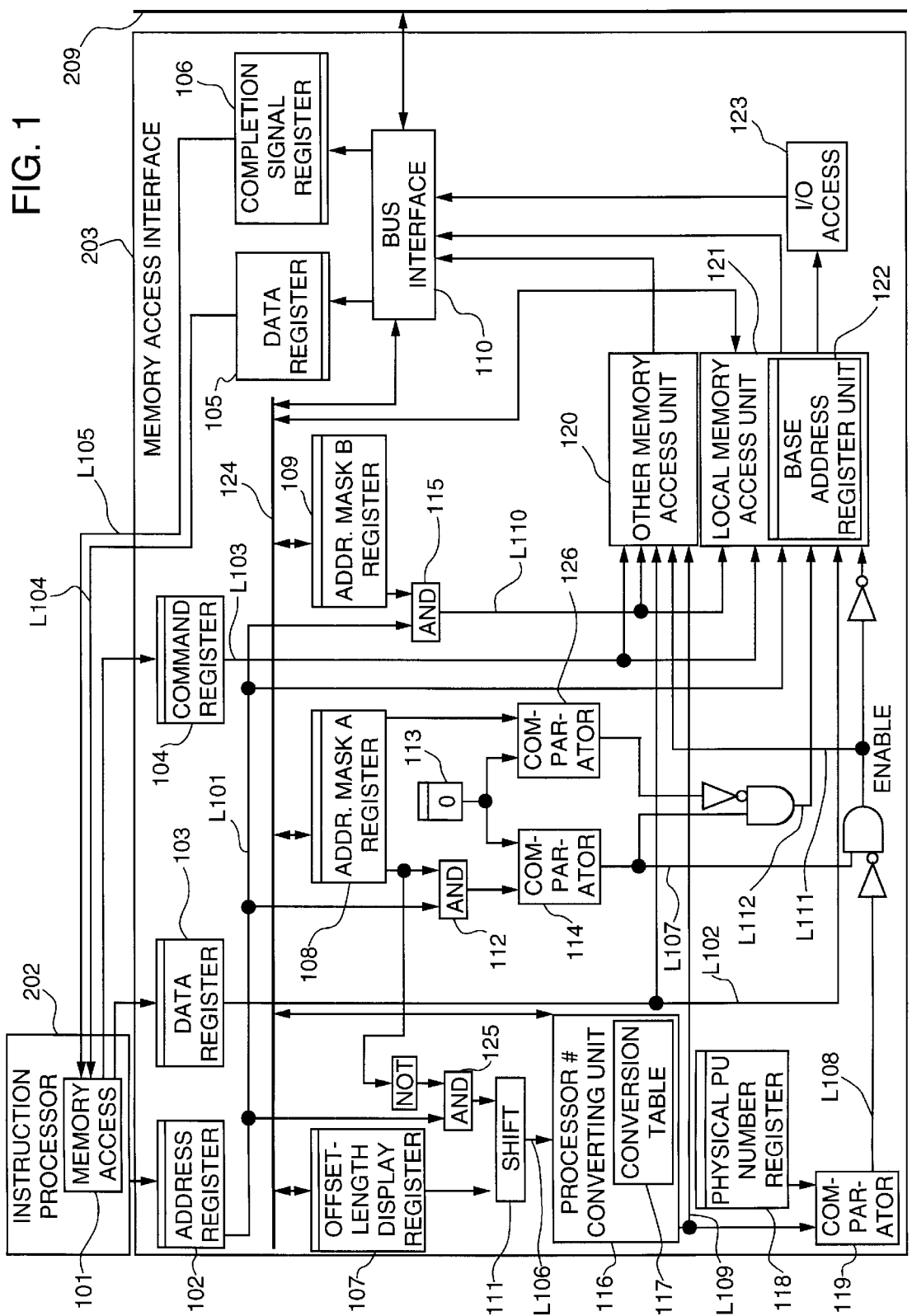
FIG. 1 shows a memory access interface.

The present invention mainly relates to the structure of the memory access interface 203 serving as one element for memory access. In FIG. 1, the instruction processor 202 sends an access request to memory access interface 203 through the memory access unit 101. The memory access interface 203 receives the access request in an address register 102 for storing the address which indicates the memory area to be accessed, a command register 104 for storing the command which indicates the type of memory access, and a data register 103 for storing the data that may be transferred depending on the type of memory access.

After the execution of the memory access request with respect to memory, the memory access interface 203 transfers any resultant data and the completion signal as required from a data register 105 and a completion signal register 106 to the memory access unit 101 in the instruction processor 202, thus completing memory access for the processor.

The memory access interface 203 is connected to the bus 209 and the bus interface 110, and in accordance with the protocol of the bus 209, exchanges data and memory access commands with the memory control 206, I/O interface 204, network interface 208, and others. There are arranged in the memory access interface 203, an offset-length display register 107, an address mask register A 108, and an address mask register B 109, to implement the address format shown in FIG. 3.

A processor number converting unit 116 converts the logical processor number of field 302, in the address format shown in FIG. 3, to the physical processor number which represents a processor 201 to be accessed, by using a processor number conversion table 117 (see FIG. 10). An other memory access unit 120, a local memory access unit 121 an I/O access unit 123 are all operated by respective addresses. The other memory access unit 120 operates when the address is to the part of main memory 207 which is a Global area of another processor (other than PU0) 201. The local memory access unit 121 operates when the address is to a Local area or the part of main memory 207 which is a Global area of the local processor PU0 201. If the address to the local I/O area, the local memory access unit 121 starts the I/O access unit 123. The local memory access unit 121 is provided with a base address register 122 that holds a value to convert the offset address into the address of the main memory in the local processor PU0 when a memory in a Local area is accessed.

The offset-length display register 107, address mask register A 108, address mask register B 109, processor number conversion table 117, and base address register 122 are connected to the bus interface 110 through the internal bus 124 to read/write data in the I/O form and the values of these registers and table are software set by the instruction processor 202.

As described before, the offset-length display register 107, address mask register A 108, and address mask register B 109 implement the address format shown in FIG. 3. The offset-length display register 107 is used for determining the number of the logical processor whose memory is to be accessed. The address mask register A 108 is used for identifying the content of the Global/Local allocation field. The address mask register B 109 is used for computing the address offset when the Global area is accessed.

The address mask register A 108 has the same bit width as the address register 102 and holds a value which contains a 1 only for the bit at a place corresponding to the Global/Local allocation field 301 in the address format shown in FIG. 3, while the other bits are 0s. With this value of the register 108 and the value of the address of the address register 102 transferred though L101, the logical AND operation is executed by an AND gate 112. The result thereof is compared in a comparator 114 with a 0 value of register 113. When a Global area is accessed, it is assumed that all the bits at the place corresponding to the Global/Local allocation field 301 represent 0. If the truth value is output to the coincidence signal L107 as the result of this comparison, it is determined that this access is to a Global area.

The offset-length display register 107 holds a value representing the bit width of an offset field 303 in the address format shown in FIG. 3. The shift register 111 takes the value of the register 107 as one of the inputs. The other input to the shift register 111 is the result of an AND operation of the address value of the address register 102 and the value of the inverted logic of each bit in the address mask register A 108, which AND operation is generated in the AND gate 125 and the request is transferred through the L101. The shift register 111 shifts the value inputted from the AND gate 125 to the right by the number of bits equivalent to the value held by the offset-length display register 107. Thereby, a signal line L106 transfers the resultant value of the shift register 111, which resultant is the logical number of the processor to be accessed.

The address mask register B 109 has the same bit width as that of the address register 102 and holds the value containing 0s for bits at places corresponding to the Global/Local allocation register 301 in the address format shown in FIG. 3 and the logical processor number field 302, while containing is for all the other bits. This register value and the address value of the address register 102 transferred through L101 are ANDd by the AND gate 115. This AND result becomes the value of a signal line L110 and produces an address offset when a Global area is accessed.

Figure 5:
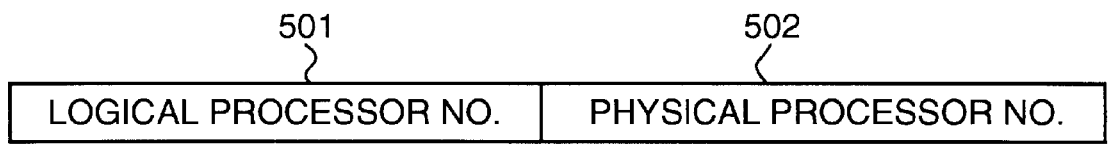
FIG. 5 shows the entries of a processor number conversion table of the memory access interface.

The value of a signal line L106, that is, the logical number of the processor to be accessed, is transferred to the processor number converting unit 116, in which this value is converted into the physical number of the processor to be accessed while referring to the processor number conversion table 117 of FIG. 10. This value of the physical number of the processor to be accessed is transferred to a signal line L109. The processor number conversion table 117 is composed of the entries of a logical processor number field 501 and a physical processor number field 502 as shown in FIG. 5.

This value of the signal line L109, th at is, the value of the physical number of the processor to be accessed is compared with the value of the physical processor number register 118 by the comparator 119. The value of the physical processor number register 118 is the physical processor number of the processor 201 in which the memory access interface 203 exists, i.e. local processor. The resultant output from the comparator 119 is transferred to a signal line L108. If the coincidence signal in L107 is true while the coincidence sign al L108 is false, the status is that the address to be accessed is in the main memory 207 of another processor 201, i.e. a Global area. Therefore, the other processor memory access unit 120 is started by a signal line L111 through which this status is transferred. On the contrary, if the status is other than this condition, the local processor memory access unit 121 is started by the signal in line L111.

When the other processor memory access unit 120 is started by the signal in line L111, this unit 120: uses the information on the signal lines L109 (the physical number of the processor to be accessed), L110 (the memory address on the processor 201 to be accessed), L103 (command) and L102 (data), which are input into the other processor memory access unit 120 at that point of time in order to start the access to the memories of the other processor 201; and transfers the information to the network interface 208 through the bus interface 110 and the bus 209. Then the network interface 208 accesses the memory of the other processor 201.

When the local processor memory unit 121 is started through the signal line L111, this unit 121 examines the value of signal line L112 (this value is obtained by the AND operation of L107 and the inverted signal of the logic of the signal generated as the result of comparison executed by a comparator 126 which outputs the true value when the two inputs, that is, the content of the address mask register A 108 and the content of the register 113 containing bits all representing 0s, coincide with each other). If this value is true, the information on the signal lines L110 (memory address), L103 (command) and L102 (data) are transferred to the memory control 206 through the bus interface 110 and the bus 209. Then the memory control 206 accesses the main memory 207.

On the other hand, if the value of the signal line L112 is false when the local processor memory access unit 121 is started, the value of the signal line L101 (memory address) is examined. If the value of L101 is within the I/O area, the I/O access unit 123 is started, and then, the information on the signal lines L101 (memory address), L103 (command) and L102 (data) are transferred to the I/O access unit 123. The I/O access unit 123 transfers the information received from the local processor memory unit 121 to the I/O interface 204 through the bus interface 110 and the bus 209 in order to start I/O access. Then the I/O interface 204 executes the I/O access.

Figure 7:
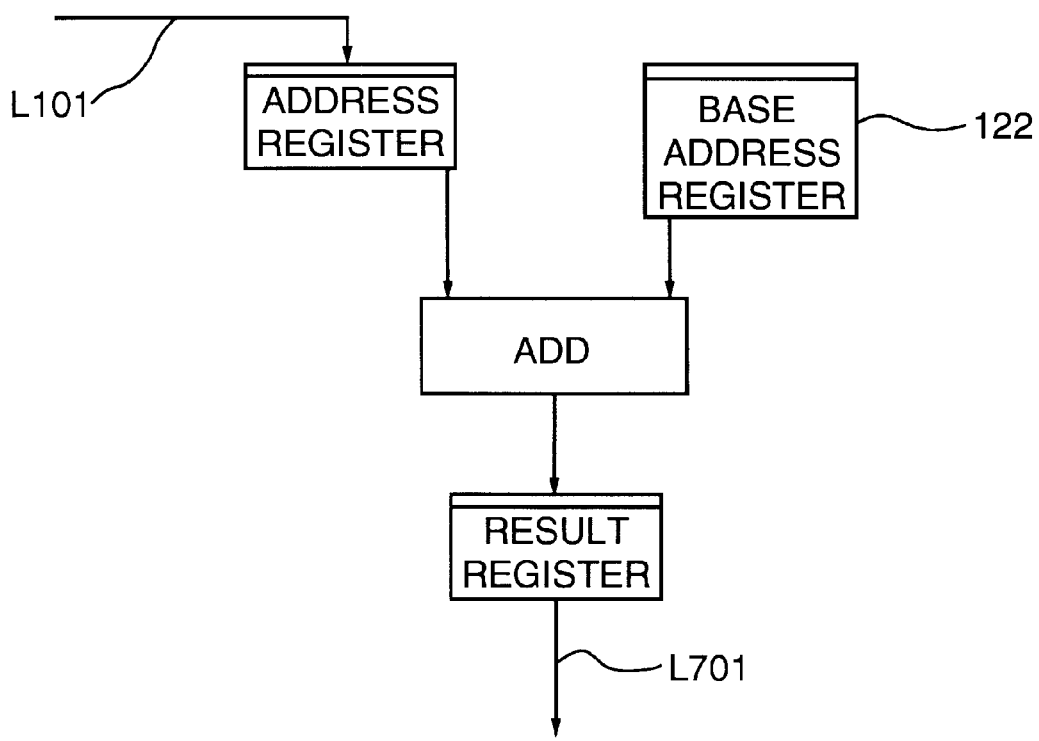
FIG. 7 illustrates the address computation in the local processor memory access unit in the memory access interface.

If the value of the signal line L112 is false when the local processor memory access unit 121 is started and if the value of the signal line L101 (memory address) is found to be within the Local memory area as the result of the examination, the value of the base address register 122 is added to the value (memory address) of the signal line L101 as shown in FIG. 7, and then, the resultant value on L701 and the information on the signal line 103 (command) and L102 (data) are transferred to the memory control 206 through the bus interface 110 and the bus 209. After that, the memory control 206 accesses the main memory 207.

The results of the accesses described above are reflected respectively on the data register 105 and the completion signal register 106 from the network interface 208, memory control unit 206, and I/O interface 204 through the bus 209 and th e bus interface 110.

Figure 6:
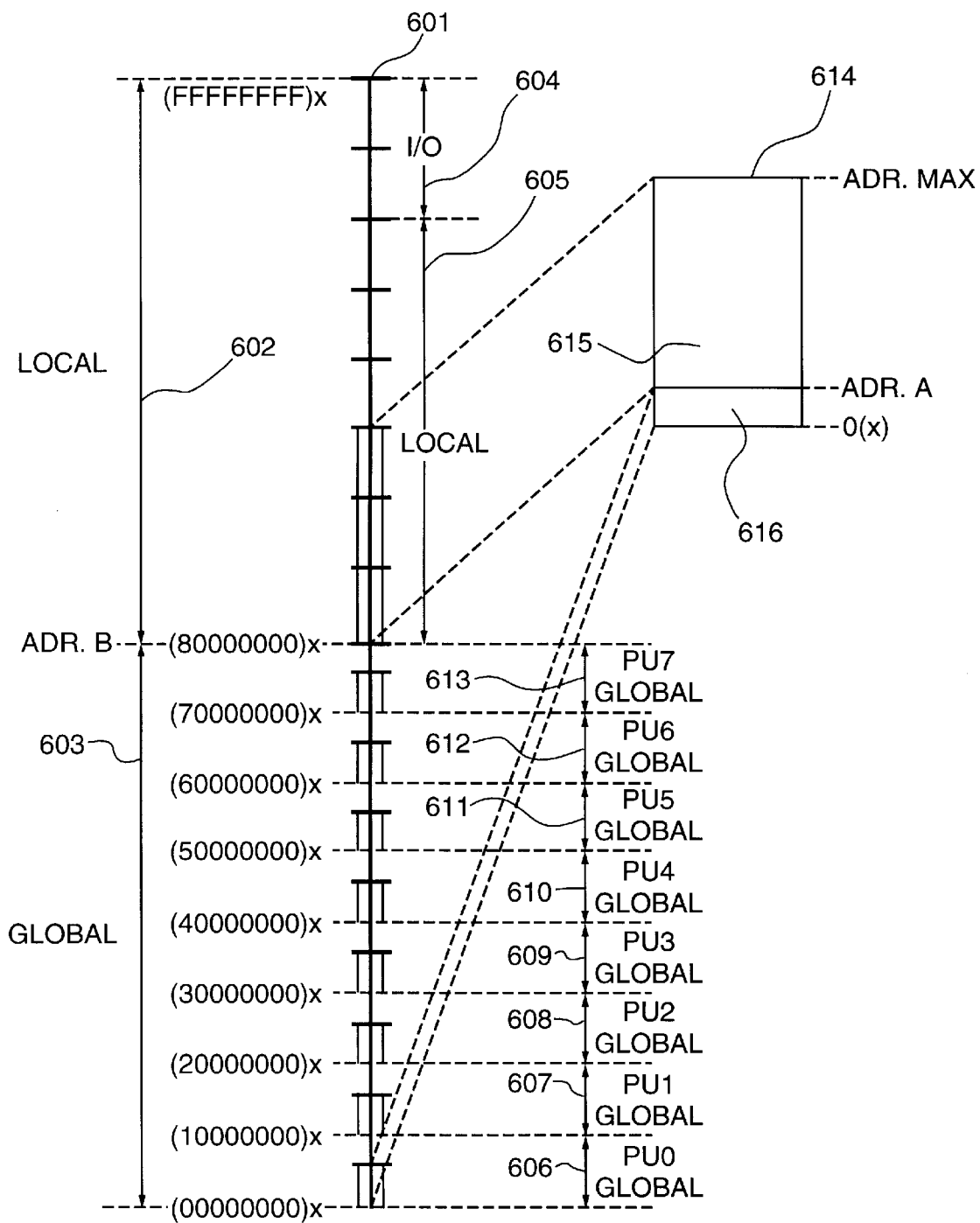
FIG. 6 illustrates the allocation of the address of a main memory and the I/O address to an address map.

Now, in conjunction with FIG. 6, description will be made of an example address map 601 in the address format shown in FIG. 3. In the address format shown in FIG. 3, one bit allocated for the Global/Local allocation field 301 and three bits allocated for the logical processor number field 302, generate the address map 601 as shown in FIG. 6. The address map 601 is equally divided into a Local area 602 and a Global area 603 by allocating one bit for the Global/Local allocation field 301.

In the case of a 32-bit address, the Global area 603 is from address $(00000000)_x$ to $(7FFFFFFF)_x$, and the Local area 602 is from address $(80000000)_x$ to $(FFFFFFFF)_x$ as shown in FIG. 6. The head address of this Local area 602 (in this case, $(8000000)_x$) is defined as Adr. B. Further, the Global area 603 is equally divided into eight parts by allocating three bits for the logical processor number field 302. These parts are defined as Global memory areas 606 to 613 for accessing by eight logical processors GLOBAL PU0, PU1, PU2, PU3, PU4, PU5, PU6, PU7 (hereinafter referred to as logical PU), for creating the distributed/shared memories. For example, in the case of a 32-bit address, the addresses are allocated at equal intervals, the addresses from $(00000000)_x$ to $(0FFFFFFF)_x$ are allocated to the Global memory area 606 which exists in the logical PU0, the addresses from $(10000000)_x$ to $(1FFFFFFF)_x$ are allocated to the Global memory area 607 which exist in the logical PU1, and so on, until the allocation is made for the Global memory area 613 which exists in the logical PU7 as shown in FIG. 6. In this way, the Global area 603 is divided into the Global memory areas 606 to 613, which are allocated to each of the logical PUs constituting the distributed/shared memories.

On the other hand, the Local area 602 is divided into the Local memory area 605 and the I/O area 604. The local memory area 605 is accessible by only the local processor but not by the other processors. The determination of the location in the Local area 602 where the I/O area 604 is allocated depends on the hardware.

Actually, however, the entire memories are not necessarily allocated with respect to the Local memory area 605 and each of the Global areas 606 to 613 of the address map 601. The amount of the memories to be allocated depends on the capacity of the main memory provided to each of the processors of the group. In the address map 601 shown in FIG. 6, memories are actually allocated to the lined parts on the left and right sides of the thick line axis of the address map 601.

Here, the description will be made of the allocation of the main memory 614 in PU0 of the address map 601. This main memory 614 is accessed by the processor whose physical processor number is 0, that is physical PU0, among the eight processors described before constituting the group. Assume an address reference in the physical PU0, and assume that the logical PU number 0 is correlated to the physical PU number 0 in the processor number conversion table 117 in the physical PU0. The main memory 614 in the physical PU0 is logically divided into a part 615 which is allocated to the Local memory area in the physical PU0 and a part 616 which is allocated to the Global memory area existing in the logical PU0. As to the address to the main memory 614, with the address Adr. A as boundary, the addresses from $(0) \times$ to (Adr. A -1) are defined as the part 616 allocated to the Global memory area existing in the logical PU0, while the addresses from Adr. A to the maximum address (Adr. max) are defined as the part 615 allocated to the Local memory area. To the main memory part 615, the addresses starting with the head address of the Local memory area 605 and corresponding to the capacity of the main memory part 615 are exclusively allocated to physical PU0. Similarly, to the main memory part 616, the addresses starting with the head address of the Local memory area 606 and corresponding to the capacity of the main memory part 616 are exclusively allocated to physical PU0.

In the physical PUs other than the physical PU0 among the above-mentioned eight processors PU0–PU7, there is a possibility that the main memory part 616 in the physical PU0 is allocated to some of the other Global memory areas 606 to 613. The Global memory area, among the areas 606 to 613, allocated depends on which logical PU the physical PU0 is correlated to, according to the processor number conversion table 117 on each physical PU. If the main memory 614 and the address map 601 are correlated to each other as shown in FIG. 6, the address offset of L1 10 in FIG. 1 is the address of the main memory when the Global area is accessed. To address the Local memory area, the value of the base address register 122 as (Adr. A - Adr. B), which represents the value added to the address of Liol already described in conjunction with FIG. 1 and FIG. 7, is given.

The value of the base address register 122, the Adr. A and the Adr. B are set by software (the Adr. B is determined by setting the address mask register A 108).

The memory access interface 203 has offset-length display register 107, address mask register A 108, address mask register B 109, base address register 122 and processor number conversion table 117 as values set by software.

The value to be set in the base address register 122 has been described in the preceding paragraph. Therefore, the description will be made of the values of the offset-length display register 107, address mask register A 108 and address mask register B 109 in conjunction with FIG. 8. The values to be set in the processor number conversion table 117 will be described later in conjunction with FIG. 9 and FIG. 10.

Figure 8:
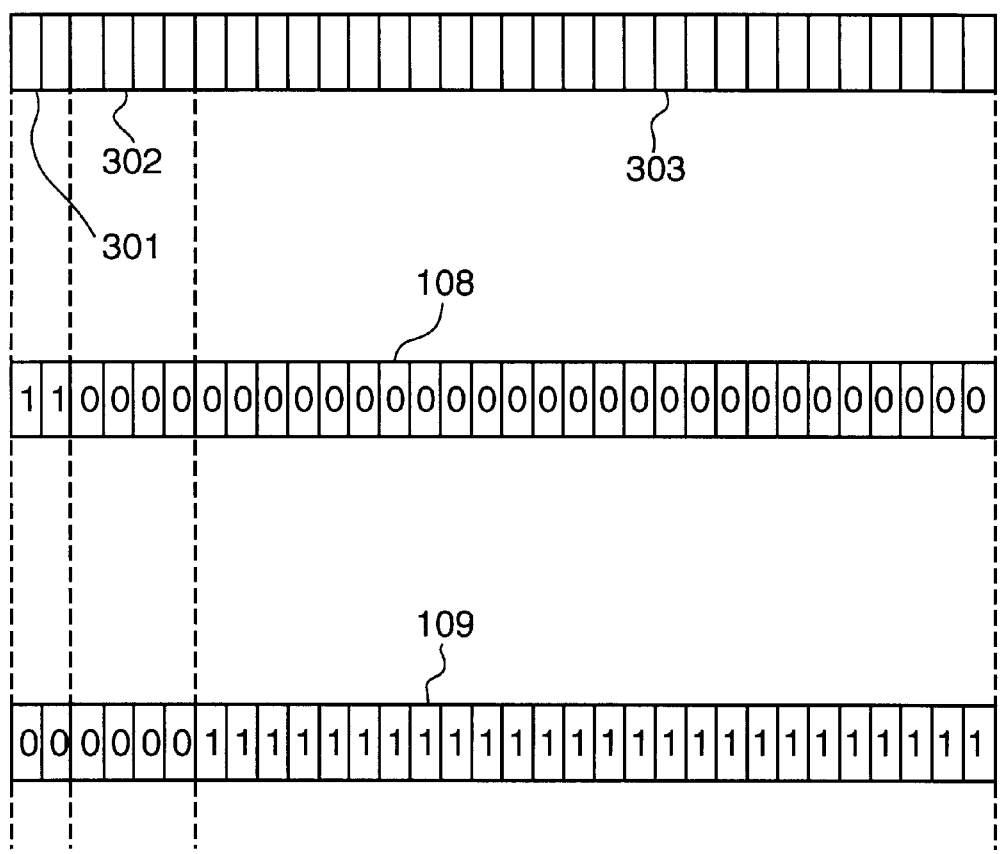
FIG. 8 illustrates an example of setting a variable value in the address format, and the setting of the address mask register A and address mask register B in the memory access interface, to reflect the setting on a memory access.

Under the 32-bit address format, in order to determine the allocation of the Global and Local areas at a ratio of (Global area):(Local area)=1:3 and to set the number of processors constituting the distributed/shared memory at 16, the Global/local allocation field 301 has a bit width of 2 bits, the logical processor number field 302 has a bit width of 4 bits, and the offset field 303 has a bit width of 26 bits in the address format, as shown in FIG. 8. To realize this address format, the offset-length display register 107 is set the value "26" which is the bit width of the offset field 303 (each division being a bit width). Similarly, the address mask register A 108 is set so that only the content of the two bit places from the left corresponding to the Global/Local allocation field 301 in address format are set at 1, and the content of the other bit places are set at 0, as shown in FIG. 8. Similarly, the address mask register B 109 is set so that only the content of the six bit places from the left corresponding to the Global/Local allocation field 301 and the logical processor number field 302 in address format are set at 0, and the content of the other places are set at 1, as shown in FIG. 8.

Next, the description will be made of an example of setting the processor number conversion table 117 of FIG. 10 and FIG. 1. FIG. 9 shows the parallel processing computer system having divided system 916 as a logical group of processors that have been logically identified and thereby divided by software. In the description given below, the divided system 916 is a memory sharing group having the distributed/shared memory in the closed world formed of only the divided system of the logical processor group. FIG. 9 shows the parallel processing computer system abstractly by only the physical PUs and a network 917 for coupling the physical PUs with each other. The parallel processing computer system shown in FIG. 9 comprises sixteen physical processors PU0 900 to PU15 915. Among these physical processors, the logical group 916 operates as a memory sharing group and comprises four physical processors PU0 900, PU1 901, PU4 904, and PU5 905. In the logical group 916, the logical processor numbers specify the processors as determined by software. Here, seeing the logical group 916 from the point of view of the physical PU0 900: the physical PU0 900 corresponds to the logical PU0 or local processor, and the physical PU1 901 corresponds to the logical PU1, the physical PU4 904 corresponds to the logical PU2 and the physical PU5 corresponds to the logical PU3, which are the other processors. When the logical group 916 operates as a memory sharing group, a conversion table 117 shown in FIG. 10 is software set showing the correlation between the logical PU numbers and physical PU numbers. The conversion table shown in FIG. 10 is effective only in the physical PU0 900. In the physical PU1 901, physical PU4 904 and physical PU5 905, tables of the same kind are created respectively.

Next, an example will be shown of specially setting the offset-length display register 107, address mask register A 108, address mask register B 109 and processor number conversion table 117. If it is desired that all the address map 601 is used as the Local area 602, the offset-length display register 107 is set at 32, each bit of the address mask register A 108 is set at 0, each bit of the address mask register B 109 is set at 1 and the logical physical PU number corresponds to the logical PU number 0 in the table 117.

The offset-length display register 107, address mask register A 108, address mask register B 109, base address register 122 and the processor number conversion table 117, whose values are set by use of software in the memory access interface 203 described above, are preferably set at one time in all the processors constituting the memory sharing logical group 916 when such a memory sharing group is defined and starts to operate as a logical computer system. However, it is possible to change the setting of the processor number conversion table 117 according to the content of the program and other processors even after the operation of the memory sharing group 916 is started.

While the preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A memory access mechanism for a parallel processing distributed/shared memory computer system of a plurality of processors, each having memory, comprising:

a fixed length memory access request address having a variable-length Global/Local allocation field, so that when the field is locally set a remainder of the address is a local memory area address, and so that when the Global/Local allocation field is set globally the remainder of the address is a variable-length processor number field for specifying one of processors and a variable length offset field for specifying a Global address on a memory of a processor specified by the processor number field; and a memory access interface for each of the processors, the memory access interface having means for identifying content of the Global/Local allocation field, means for extracting content of the processor number field, means for extracting content of the offset field, means for starting access to a local memory area when the means for identifying indicates locally set and when the means for identifying indicates set globally and the content of the processor number field indicates a local processor, and means for starting access to memory of another processor other than the local processor by an address of the offset field when the means for identifying indicates set globally and the processor number field indicates the another processor.

2. A memory access mechanism according to claim 1, wherein said means for identifying comprises a mask register for drawing out a part of the memory access request address by use of a mask;

said means for extracting content of the processor number field comprises a register for showing bit width of the offset field;

said means for extracting content of the offset field comprises a mask register for drawing out a part of the memory access request address by use of a mask; and wherein content of each of said mask registers and the content of the register for showing bit width of the offset field, each being rewrittable in accordance with an instruction issued by one of the processors.

3. A memory access mechanism according to claim 1, wherein content of said processor number field is a logical processor number;

further including means for converting a logical processor number of said processor number field into a physical processor number; and wherein each of said means for starting uses said physical processor number.

4. A memory access mechanism according to claim 3, wherein said means for identifying comprises a mask register for drawing out a part of the memory access request address by use of a mask;

said means for extracting content of the processor number field comprises a register for showing bit width of the offset field;

said means for extracting content of the offset field comprises a mask register for drawing out a part of the memory access request address by use of a mask; and wherein content of each of said mask registers and the content of the register for showing bit width of the offset field, each being rewrittable in accordance with an instruction issued by one of the processors.

5. A memory access mechanism according to claim 2, wherein said means for starting access to a local memory area comprises a base address register for holding address addition information for converting an offset head address of said memory access request address to a head address of the local memory area, and the content of said base address register being rewrittable in accordance with an instruction by a processor.

6. A parallel processing computer system, with distributed/shared memory, comprising:

a plurality of arithmetic processors;

a plurality of local memories, each locally coupled to a respective one of said processors and being divided into a local memory area and a global memory area;

a network interconnecting the processors for parallel processing as a parallel processing computer system;

each of the processors accessing the local memory area in the locally coupled local memory and the global memory area in each of the local memories of all others of said processors, to provide the parallel processing computer system with distributed/shared memory; and each of said processors including a memory access interface receiving, storing and processing a fixed bit length memory access address having a variable length processor number field and a variable length memory address field.

7. A parallel processing computer system according to claim 6, further including a processor number converting unit for converting a logical processor number in the variable length processor number field into a physical processor number.

8. A parallel processing computer system according to claim 7, wherein said processor number converting unit includes a conversion table having physical processor number entries and rewrittable logical processor number entries.

9. A parallel processing computer system according to claim 7, further including means for logically defining an arbitrary global group of only some of said processors, means for setting a bit length of the processor number field to a minimum bit length sufficient to logically identify the some of said processors of said global group, and means for setting the memory address field to an offset address of a maximum bit length that uses available bits not used by the setting of the processor number field.

10. A parallel processing computer system according to claim 9, wherein said some of said processors have a memory map with addressable memory size corresponding to the fixed bit length of said memory access address; and
wherein said memory access interface of each processor dynamically allocates the global memory area within a locally coupled local memory so that maximum global memory area corresponds in size to maximum memory area that may be addressed according to the maximum bit length of the offset address.

11. A parallel processing computer system according to claim 9, wherein said memory access address includes a global/local identification field, for holding a one bit length value identifying the memory address field as holding a local or a global address;
wherein each local memory includes one-half allocation to said local memory area addressable by one value of the global/local identification field, and an other half allocation being said global memory area addressable by another value of said global/local allocation field; and
said global memory area being equally divided into memory global allocations, with a number of divisions being equal to a number of processors within the global group and the memory global allocations being respectively addressed by a value in the processor number field, whereby the maximum size of each memory global allocation is dynamically set to a maximum size depending upon the number of dynamically set processors within the global group.

12. A parallel processing computer system according to claim 11, wherein said local memory area is divided between an input/output allocation and a maximum local memory allocation, whereby the local processor globally addresses a divided allocation of the global memory area allocated to the local and other processors of the global group, and locally addresses local memory area of the local memory allocation and the input/output allocation.

13. A parallel processing computer system according to claim 6, further including means for logically defining an arbitrary global group of only some of said processors, means for setting a bit length of the processor number field to a minimum bit length sufficient to logically identify the some of said processors of said global group, and means for setting the memory address field to an offset address of a maximum bit length that uses available bits not used by the setting of the processor number field.

14. A parallel processing computer system according to claim 13, wherein said some of said processors have a memory map with addressable memory size corresponding to the fixed bit length of said memory access address; and
wherein said memory access interface of each processor dynamically allocates the global memory area within the locally coupled local memory so that maximum global memory area corresponds in size to maximum memory area that may be addressed according to the maximum bit length of the offset address.

15. A parallel processing computer system according to claim 14, wherein each memory map includes global memory areas for only the some of said processors of said global group and not for others of said processors.

16. A parallel processing computer system according to claim 6, wherein said memory access address includes a global/local identification field, for holding a value identifying the memory address field as holding a local or a global address.

17. A parallel processing computer system according to claim 16, wherein said memory access interface detects whether said global/local identification field identifies local accessing or global accessing, and in response to detecting local accessing interprets all remaining bits of said memory access address, other than the global/local identification field, as a local address in the local memory area, and in response to detecting global accessing interprets the remaining bits as a logical processor number and an address offset within the global memory area of the processor identified by the logical processor number.

18. A parallel processing computer system according to claim 16, wherein the memory access interface includes an other memory access unit runnable only when the global/local identification field indicates a global address, and a separate local memory access unit runnable when the address does not have a global/local identification field indicating global access.

19. A parallel processing computer system according to claim 18, wherein said local memory access unit includes an offset address register for receiving an offset address from said memory address field, a software resettable base address register, an addition unit for adding output of the offset address register and output of the base address register to produce a result, and a result register for holding the result; and
said memory access interface further including an input/output access unit for receiving the result from said result register, and sending the result to said local memory area.

20. A parallel processing computer system according to claim 16, including means for software setting said global/local identification field to a variable length, including both a zero bit length and a one bit length.

21. A parallel processing computer system according to claim 20, wherein said memory access interface interprets the value of said global/local identification field, and in response to a zero bit length of said global/local identification field interprets all bits of said memory access address as a local address in the local memory area, and in response to determining a global accessing from said global/local identification field, interprets remaining bits as a logical processor number and an address offset within the global memory area of the processor identified by the logical processor number.

22. A parallel processing computer system according to claim 20, further including means for logically defining an arbitrary global group of only some of said processors, means for setting a bit length of the processor number field to a minimum bit length sufficient to logically identify the some of said processors of said global group, and means for setting the memory address field to an offset address of a maximum bit length that uses available bits not used by the setting of the processor number field.

23. A parallel processing computer system according to claim 22, wherein at least some of said processors have a memory map with addressable memory size corresponding to the fixed bit length of said memory access address; and
wherein said memory access interface of each processor dynamically allocates the global memory area within locally coupled local memory so that maximum global memory area corresponds in size to maximum memory area that may be addressed according to the maximum bit length of the offset address.

24. A parallel processing computer system according to claim 6, wherein said processor number field is a physical processor number field.

25. A parallel processing computer system according to claim 6, wherein said memory access interface includes a rewrittable base address register holding address addition information to convert a head offset address from said address field into a physical head address of the local memory area.

26. A parallel processing computer system according to claim 6, wherein each of said processors includes a processor internal bus, an instruction processor, the memory access interface coupled between said instruction processor and said processor internal bus, an input/output device, an input/output interface coupled between said input/output device and said processor internal bus, a memory control coupled between said locally coupled local memory and said processor internal bus, and a network interface coupled between said processor internal bus and said network.

27. A parallel processing computer system according to claim 26, wherein said memory access interface further includes a data register coupled to said processor internal bus for receiving any data from completion of the memory access and sending the data to the said instruction processor, and a completion signal register coupled to said processor internal bus and said instruction processor for sending a completion signal to said instruction processor at the completion of memory access.

28. A parallel processing computer system according to claim 26, wherein said memory access interface further includes a software settable register to separate a processor number from said memory access address, and said memory access interface further including a software settable address mask register for providing a mask to separate an offset address from said memory access address.

* * * * *